United States Patent
Du

(10) Patent No.: US 10,936,919 B2
(45) Date of Patent: Mar. 2, 2021

(54) METHOD AND APPARATUS FOR DETECTING HUMAN FACE

(71) Applicant: Baidu Online Network Technology (Beijing) Co., Ltd., Beijing (CN)

(72) Inventor: Kang Du, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 43 days.

(21) Appl. No.: 16/052,421

(22) Filed: Aug. 1, 2018

(65) Prior Publication Data

US 2019/0087686 A1 Mar. 21, 2019

(30) Foreign Application Priority Data

Sep. 21, 2017 (CN) .......................... 201710858134.0

(51) Int. Cl.
| | |
|---|---|
| *G06N 3/08* | (2006.01) |
| *G06K 9/62* | (2006.01) |
| *G06K 9/00* | (2006.01) |
| *G06N 3/04* | (2006.01) |
| *G06K 9/72* | (2006.01) |

(52) U.S. Cl.
CPC ......... *G06K 9/629* (2013.01); *G06K 9/00228* (2013.01); *G06K 9/00248* (2013.01); *G06K 9/00281* (2013.01); *G06K 9/6232* (2013.01); *G06K 9/726* (2013.01); *G06N 3/0454* (2013.01); *G06N 3/08* (2013.01)

(58) Field of Classification Search
CPC .......... G06K 9/00281; G06K 9/00302; G06K 9/4628; G06N 3/0454; G06N 3/082; G06N 7/005
See application file for complete search history.

(56) References Cited

U.S. PATENT DOCUMENTS

| | | | | |
|---|---|---|---|---|
| 2016/0148080 | A1* | 5/2016 | Yoo | G06K 9/4628 382/157 |
| 2018/0150684 | A1* | 5/2018 | Wang | G06T 7/11 |
| 2018/0239977 | A1* | 8/2018 | Matsimanis | G06K 9/00288 |

FOREIGN PATENT DOCUMENTS

| | | |
|---|---|---|
| CN | 105631398 A | 6/2016 |
| CN | 106778867 A | 5/2017 |
| CN | 107145833 A | 9/2017 |

OTHER PUBLICATIONS

Oliveria, G.L., et al; "Deep Learning for Human Part Discovery in Images" *IEEE ICRA* ; p. 1634-1641; 2016.

* cited by examiner

*Primary Examiner* — Quan M Hua
(74) *Attorney, Agent, or Firm* — Seed IP Law Group LLP

(57) ABSTRACT

The present disclosure discloses a method and apparatus for detecting a human face. A specific embodiment of the method comprises: acquiring a to-be-detected image; inputting the to-be-detected image into a pre-trained first convolutional neural network to obtain facial feature information, the first convolutional neural network being used to extract a facial feature; inputting the to-be-detected image into a pre-trained second convolutional neural network to obtain semantic feature information, the second convolutional neural network being used to extract a semantic features of the image; and analyzing the facial feature information and the semantic feature information to generate a face detection result. This embodiment improves accuracy of a detection result of a blurred image.

17 Claims, 5 Drawing Sheets

METHOD AND APPARATUS FOR DETECTING HUMAN FACE

CROSS-REFERENCE TO RELATED APPLICATION

This application claims the priority of Chinese Application No. 201710858134.0, filed on Sep. 21, 2017, entitled "Method and Apparatus for Detecting Human Face," the entire disclosure of which is incorporated herein by reference.

TECHNICAL FIELD

The present disclosure relates to the field of computer technology, specifically to the field of Internet technology, and more specifically to a method and apparatus for detecting a human face.

BACKGROUND

As the Internet technology develops, the face detection technology is applied to more and more fields. For example, the identity verification may be performed by a face detection. In general, the existing face detection method is to directly detect a facial region of a captured image. However, an image of a person captured in a motion state (e.g., in a running state and in a jumping state) of the person is generally blurred and unable to display a clear facial outline and clear facial features. Therefore, the existing method has a problem of low accuracy of a detection result of the blurred image.

SUMMARY

An objective of the embodiments of the present disclosure is to provide an improved method and apparatus for detecting a human face to solve the technical problem mentioned in the foregoing background section.

In a first aspect, the embodiments of the present disclosure provide a method for detecting a human face. The method including: acquiring a to-be-detected image; inputting the to-be-detected image into a pre-trained first convolutional neural network to obtain facial feature information, the first convolutional neural network being used to extract a facial feature; inputting the to-be-detected image into a pre-trained second convolutional neural network to obtain semantic feature information, the second convolutional neural network being used to extract a semantic feature of the image; and analyzing the facial feature information and the semantic feature information to generate a face detection result.

In some embodiments, the facial feature information includes a first facial feature map and multiple second facial feature maps. Each point in the first facial feature map is used to represent a confidence level of the human face located in a region of the to-be-detected image corresponding to the each point of the first facial feature map. Each point in each of the plurality of second facial feature maps is used to represent position information of a region of the to-be-detected image corresponding to the each point of the second facial feature map. The first facial feature map and the second facial feature maps are respectively represented by matrixes.

In some embodiments, the semantic feature information includes a probability of each point in the to-be-detected image belonging to each preset category of multiple preset categories. The multiple preset categories include a background category and at least one of: a hair category, an eye category, a nose category, a mouth category, and a skin color category. The semantic feature information is represented by a matrix.

In some embodiments, the analyzing the facial feature information and the semantic feature information to generate a face detection result includes: combining the facial feature information and the semantic feature information to generate combined feature information; and inputting the combined feature information into a pre-trained third convolutional neural network to obtain the face detection result. The third convolutional neural network is used to represent a correspondence of the face detection result to the facial feature information and the semantic feature information.

In some embodiments, the combining the facial feature information and the semantic feature information to generate combined feature information includes: combining the facial feature information and the semantic feature information to generate the combined feature information in any one of the following ways: multiplying the facial feature information by the semantic feature information based on corresponding elements, obtaining respective maximum values of respective corresponding elements of the facial feature information and the semantic feature information, and performing threshold truncation on the facial feature information and the semantic feature information based on the corresponding elements.

In some embodiments, the method further includes training the third convolutional neural network. The training includes: extracting a preset training sample, where the training sample includes facial feature information and semantic feature information of multiple images; combining facial feature information and semantic feature information of each image of the plurality of images to obtain combined feature information of the each image; and using the combined feature information of the each image of the plurality of images as an input and the face detection result as an output to train and obtain the third convolutional neural network by using a machine learning method.

In a second aspect, the embodiments of the present disclosure provide an apparatus for detecting a human face. The apparatus includes: an acquiring unit, configured to acquire a to-be-detected image; a first inputting unit, configured to input the to-be-detected image into a pre-trained first convolutional neural network to obtain facial feature information, the first convolutional neural network being used to extract a facial feature; a second inputting unit, configured to input the to-be-detected image into a pre-trained second convolutional neural network to obtain semantic feature information, the second convolutional neural network being used to extract a semantic feature of the image; and a generating unit, configured to analyze the facial feature information and the semantic feature information to generate a face detection result.

In some embodiments, the facial feature information includes a first facial feature map and multiple second facial feature maps. Each point in the first facial feature map is used to represent a confidence level of the human face located in a region of the to-be-detected image corresponding to the each point of the first facial feature map. Each point in each of the multiple second facial feature maps is used to represent position information of a region in the to-be-detected image corresponding to the each point of the second facial feature map. The first facial feature map and the second facial feature maps are respectively represented by matrixes.

In some embodiments, the semantic feature information includes a probability of each point in the to-be-detected image belonging to each preset category of multiple preset categories. The plurality of preset categories include a background category and at least one of: a hair category, an eye category, a nose category, a mouth category, and a skin color category. The semantic feature information is represented by a matrix.

In some embodiments, the generating unit includes: a combining module, configured to combine the facial feature information and the semantic feature information to generate combined feature information; and an inputting module, configured to input the combined feature information into a pre-trained third convolutional neural network to obtain the face detection result. The third convolutional neural network is used to represent a correspondence of the face detection result to the facial feature information and the semantic feature information.

In some embodiments, the combining module is further configured to combine the facial feature information and the semantic feature information to generate the combined feature information in any one of the following ways: multiplying the facial feature information by the semantic feature information based on corresponding elements, obtaining respective maximum values of respective corresponding elements of the facial feature information and the semantic feature information, and performing threshold truncation on the facial feature information and the semantic feature information based on the corresponding elements.

In some embodiments, the apparatus further includes: an extracting unit, configured to extract a preset training sample, wherein the training sample includes facial feature information and semantic feature information of multiple images; a combining unit, configured to combine facial feature information and semantic feature information of each image of the multiple images to obtain combined feature information of the each image; and a training unit, configured to use the combined feature information of the each image of the multiple images as an input and the face detection result as an output to train and obtain the third convolutional neural network by using a machine learning method.

In a third aspect, the embodiments of the present provide a server. The server includes: one or more processors; and a storage device, configured to store one or more programs. The one or more programs, when executed by the one or more processors, cause the one or more processors to implement the method in any embodiment of the method for detecting a human face.

In a fourth aspect, the embodiments of the present provide a computer readable storage medium storing a computer program. The program, when executed by a processor, implements the method in any embodiment of the method for detecting a human face.

In the method and apparatus for detecting a human face provided by the embodiments of the present disclosure, the facial feature information is obtained by inputting the acquired to-be-detected image into the pre-trained first convolutional neural network. Then, the facial feature information is inputted into the pre-trained second convolutional neural network to obtain the semantic feature information. Finally, the facial feature information and the semantic feature information are analyzed to generate the face detection result. Therefore, the face detection is performed by combining the facial feature information and the semantic feature information, such that a blurred image that is unable to display a clear facial outline and clear facial features can be detected, thereby improving the accuracy of the detection result of the blurred image.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
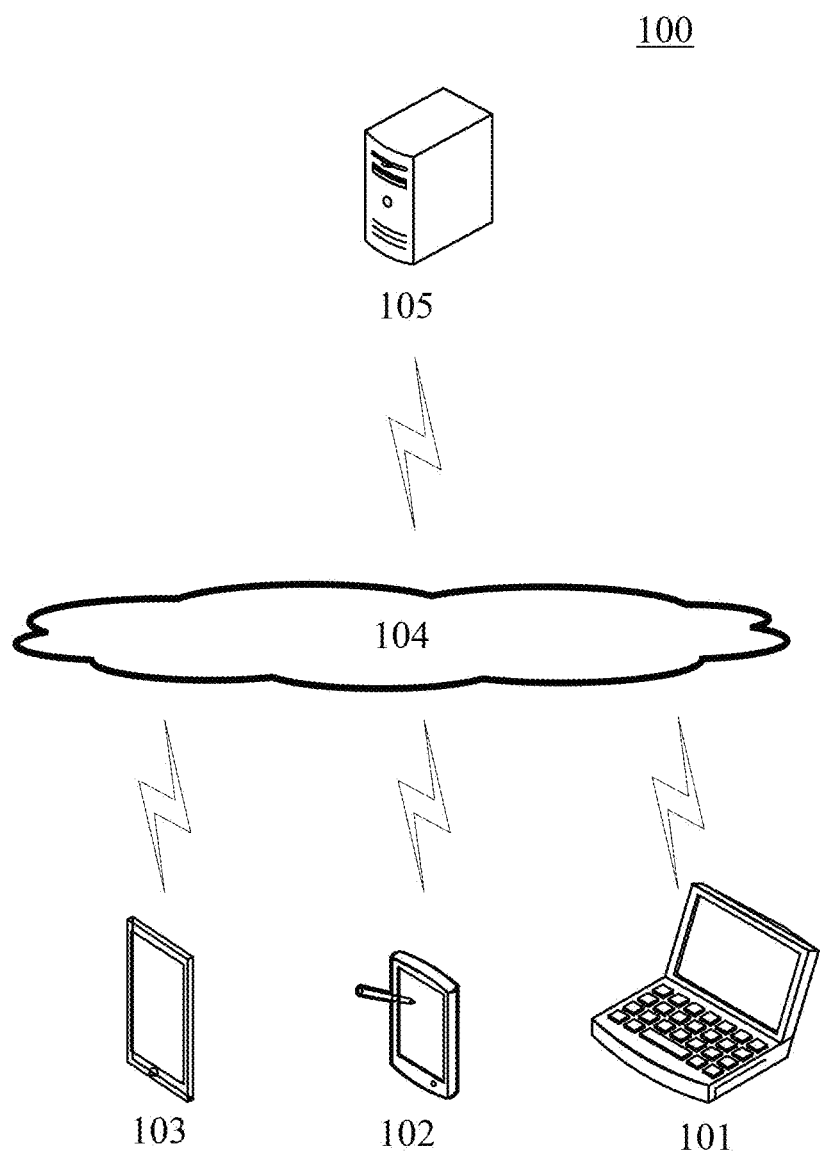
FIG. 1 is an exemplary system architecture diagram applicable to the present disclosure.

FIG. 1 shows an exemplary system architecture 100 which may be used by an image generating method or an image generating apparatus according to the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as photo and video applications, image processing applications, and searching applications may be installed on the terminal devices 101, 102 and 103.

The terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, an image processing server processing an image uploaded by the terminal devices 101, 102 or 103. The image processing server may analyze and process a received to-be-detected image, and return data (such as a detection result of the human face) to the terminal devices.

It should be noted that the method for detecting the human face according to the embodiments of the present disclosure may be executed by the server 105. Accordingly, the apparatus for detecting the human face is generally disposed on the server 105.

It should be pointed out that the server 105 may also directly store the to-be-detected image locally, and the server 105 may directly extract the local to-be-detected image for detection. In such case, the exemplary system architecture 100 may not include the terminal devices 101, 102 and 103 and the network 104.

It should be pointed out that an image processing application may alternatively be provided in the terminal devices 101, 102 and 103. The terminal devices 101, 102 and 103 may also perform the face detection on the to-be-detected image based on the image processing application. In such case, the apparatus for detecting a human face may alternatively be executed by the terminal devices 101, 102 and 103, and correspondingly, the apparatus for detecting a human face may alternatively be disposed in the terminal devices 101, 102, 103. In such case, the exemplary system architecture 100 may not include the server 105 and the network 104.

It should be understood that the numbers of the terminal devices, the networks and the servers in FIG. 1 are merely illustrative. Any number of terminal devices, networks and servers may be provided based on the actual requirements.

Figure 2:
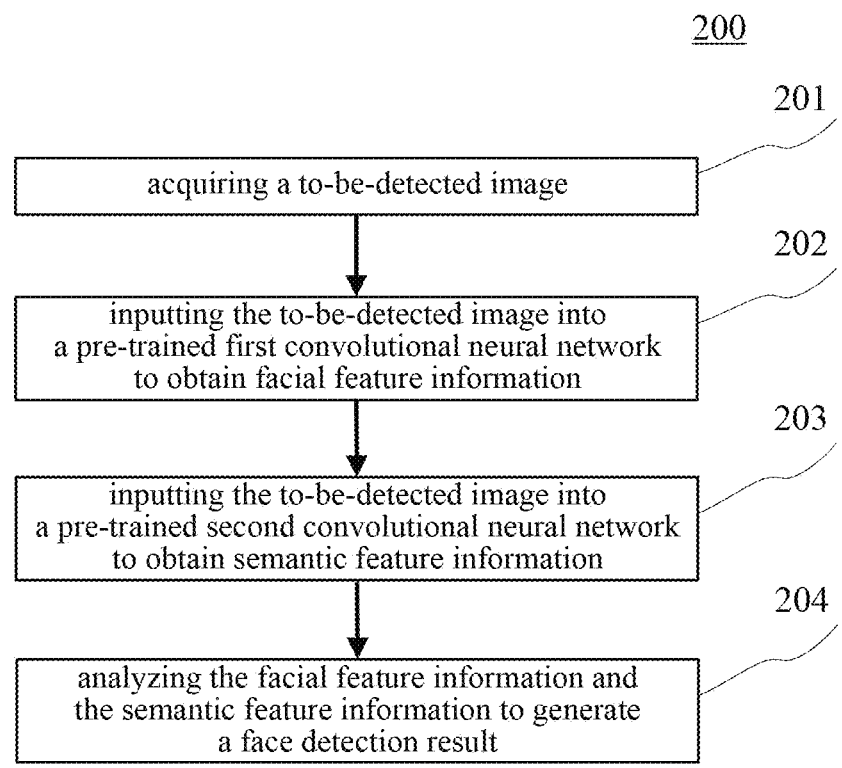
FIG. 2 is a flowchart of an embodiment of a method for detecting a human face according to the present disclosure.

Further referring to FIG. 2, which illustrates a flow 200 of an embodiment of a method for detecting a human face according to the present disclosure. The method for detecting a human face includes the following steps 201 to 204.

Step 201 includes acquiring a to-be-detected image.

In this embodiment, an electronic device (e.g., the server 105 as illustrated in FIG. 1) on which the method for detecting a human face is performed may acquire the to-be-detected image. The to-be-detected image may be various kinds of images, for example, a blurred image of a person captured in a motion state (e.g., in a running state and in a jumping state) of the person or a clear image of the person captured in a stationary state of the person. Here, the to-be-detected image may be uploaded to the electronic device by a client (e.g., the terminal devices 101, 102 and 103 as illustrated in FIG. 1) communicated with the electronic device by means of a wired connection or a wireless connection. The to-be-detected image may alternatively be locally stored by the electronic device. It should be pointed out that the wireless connection may include, but not limited to, a 3G/4G connection, a WiFi connection, a bluetooth connection, a WiMAX connection, a Zigbee connection, an UWB (ultra wideband) connection, and other wireless connections now known or developed in the future.

Step 202 includes inputting the to-be-detected image into a pre-trained first convolutional neural network to obtain facial feature information.

In this embodiment, the electronic device may input the to-be-detected image into the pre-trained first convolutional neural network to obtain the facial feature information. The first convolutional neural network may be used to extract a facial feature. The first convolutional neural network may include at least one convolutional layer and at least one pooling layer. The convolutional layer may be used to extract an image feature and the pooling layer may be used to perform downsampling on the inputted information. In practice, the convolutional neural network (CNN) is a feed-forward neural network, and an artificial neuron of the neural network may respond to a part of surrounding cells within the coverage range. Thus, the convolutional neural network has excellent performance in image processing. Therefore, the convolutional neural network may be used to extract image feature information. Here, the facial feature information may be information for representing the facial feature in the image. The facial feature may be various basic elements (e.g., a probability of being the human face, and a position of the human face) related to the human face. In practice, the first convolutional neural network may be a fully convolutional network (FCN).

It should be noted that the first convolutional neural network may be obtained by performing supervised training on the existing deep convolutional neural network (e.g., DenseBox, VGGNet, ResNet, and SegNet) using a machine learning method and a training sample. The training sample may include a large number of images and an annotation of each image, and the annotation may include an annotation for indicating whether a region is a facial region and an annotation for indicating a position of the facial region (e.g., a coordinate value).

In some alternative implementations of this embodiment, the facial feature information may include a first facial feature map and multiple second facial feature maps (for example, four second facial feature maps or more than four second facial feature maps). Each point in the first facial feature map may be used to represent a confidence level (may be used to represent a possibility or probability of the human face located in a corresponding region) of the human face located in the region of the to-be-detected image corresponding to the point of the first facial feature map. Each point in each of the second facial feature maps may be used to represent position information of the region of the to-be-detected image corresponding to the point of the second facial feature map. It should be noted that the first facial feature map and the second facial feature maps may be represented by matrices. Each point in the first facial feature map and the second facial feature maps may be a numerical value in the matrices. In practice, since the first convolutional neural network includes the pooling layer for performing the downsampling operation, each point in the facial feature maps corresponds to one region of the to-be-detected image. As an example, the multiple second facial feature maps may be four second facial feature maps, and points of the four second facial feature maps may be respectively used to represent a horizontal coordinate of an upper-left vertex, a vertical coordinate of the upper-left vertex, a horizontal coordinate of a lower-right vertex, and a vertical coordinate of the lower-right vertex of a corresponding region in the to-be-detected image.

In some alternative implementations of this embodiment, the facial feature information may include a first facial global feature map, multiple second facial global feature maps (for example, four second facial global feature maps or more than four second facial global feature maps), at least one first facial local feature map, and multiple second facial local feature maps (for example, four second facial local feature maps or more than four second facial local feature maps) corresponding to each one of the at least one first facial local feature map. Each point in the first facial global feature map may be used to represent a confidence level (may be used to represent a possibility or probability of the human face located in the region) of a whole human face located in the region of the to-be-detected image corresponding to the point in the first facial global feature map. Each point in each of the multiple second facial global feature maps may be used to represent position information of the region in the to-be-detected image corresponding to the point in the second facial global feature map. Each point in each of the at least one first facial local feature map may be used to represent a confidence level of a part of the human face located in the region in the to-be-detected image corresponding to the point in the first facial local feature map. Each point in each of the multiple second facial local feature maps may be used to represent position information of the region in the to-be-detected image corresponding to the point in the second facial local feature map. It should be noted that the first facial global feature map, the second facial global feature maps, the first facial local feature map and the second facial local feature maps may be represented by matrices. Each point in the first facial global feature map, the second facial global feature maps, the first facial local feature map and the second facial local feature maps may be a numerical value in the matrices. In practice, since the first convolutional neural network includes the pooling layer for performing the downsampling operation, each point in the first facial global feature map, the second facial global feature maps, the first facial local feature map and the second facial local feature maps corresponds to one region of the to-be-detected image. In practice, the part of the human face may be one or more parts of the human face, such as an ear, an eye, a nose, a mouth, a chin, an eyebrow, and a forehead.

Step 203 includes inputting the to-be-detected image into a pre-trained second convolutional neural network to obtain semantic feature information.

In this embodiment, the electronic device may input the to-be-detected image into the pre-trained second convolutional neural network to obtain the semantic feature information. The second convolutional neural network may be used to extract a semantic feature of the image. After the to-be-detected image is inputted into the pre-trained second convolutional neural network, the second convolutional neural network may successively perform a downsampling process (e.g., downsampling to ¹⁄₁₆ of the original scale) and an upsampling process (e.g., upsampling from ¹⁄₁₆ of the original scale to the original scale). The second convolutional neural network may include at least one convolutional layer, at least one pooling layer, at least one unpooling layer, and at least one deconvolutional layer. The convolutional layer may be used to extract the semantic feature, and the pooling layer may be used to perform downsampling on the inputted semantic feature to obtain a sparse classification result. The unpooling layer may be used to perform upsampling on the inputted content. The deconvolutional layer is used to perform a deconvolution operation on the inputted information. A convolutional kernel of the convolutional layer is transposed into a convolution kernel of the deconvolutional layer to process the inputted content. A dense classification result may be obtained after the unpooling layer and the deconvolutional layer process the information. The last deconvolutional layer of the second convolutional neural network may output the semantic feature information of the to-be-detected image. It should be pointed out that the semantic feature information may be used to represent a category (e.g., background, human face, and body) to which each point (i.e., pixel) in the to-be-detected image belongs.

Here, the semantic feature information of each point in the to-be-detected image may be represented by a vector.

It should be noted that the second convolutional neural network may be obtained by performing supervised training on the existing convolutional neural network (e.g., Dense-Box, VGGNet, ResNet, and SegNet) by using a machine learning method and a training sample. The training sample may include a large number of blurred image samples and an annotation for each point in the blurred image samples. The annotation for each point may be a vector for representing a related category of the point.

It should be noted that the electronic device may perform step 202 and step 203 at the same time.

Step 204 includes analyzing the facial feature information and the semantic feature information to generate a face detection result.

In this embodiment, the electronic device may analyze the facial feature information and the semantic feature information in various ways to generate the face detection result. As an example, the electronic device may pre-store a table of a correspondence of a large amount of facial feature information and semantic feature information to the face detection result. The correspondence table may be pre-established by a technician through a lot of statistics. The electronic device may directly query, from the correspondence table, the face detection result matching the facial feature information obtained in step 202 and the semantic feature information obtained in step 203. The face detection result may indicate a position (for example, may be represented by a coordinate of an upper left corner of the facial region and a coordinate of a lower right corner of the facial region) of the facial region in the to-be-detected image.

Figure 3:
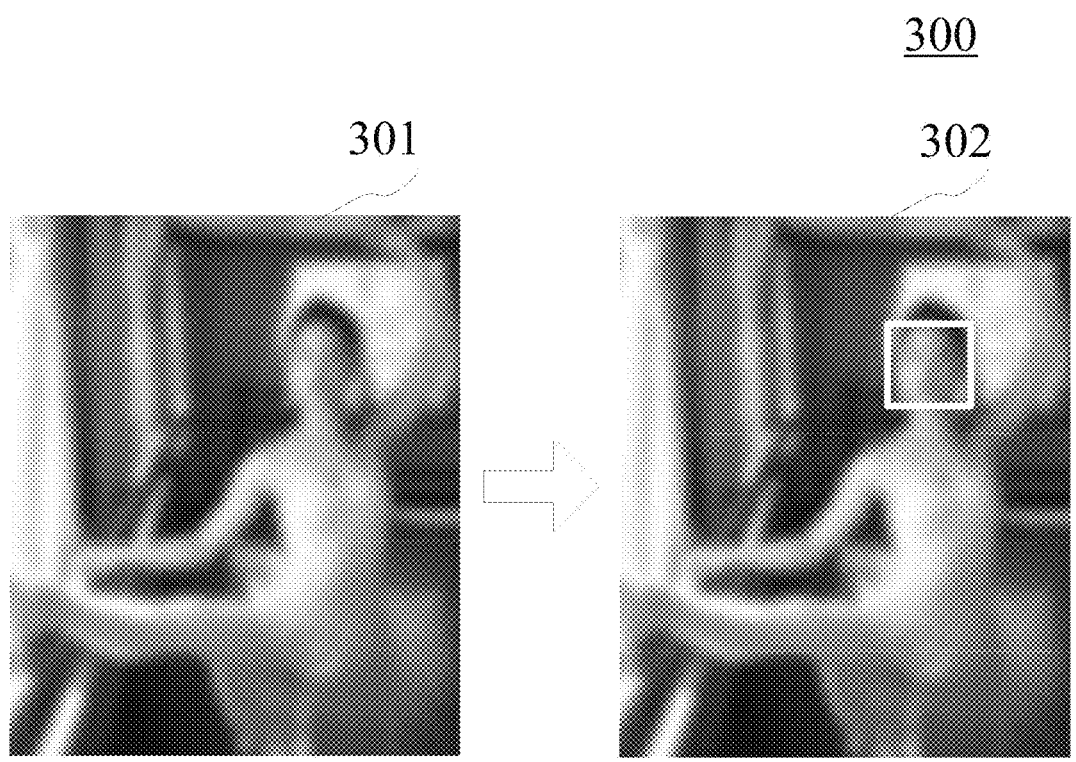
FIG. 3 is a schematic diagram of an application scenario of the method for detecting a human face according to the present disclosure.

Further referring to FIG. 3, which is a schematic diagram of an application scenario of the method for detecting a human face according to this embodiment. In the application scenario of FIG. 3, a client first uploads a to-be-detected image 301 to an image processing server. Then, the image processing server inputs the to-be-detected image 301 to a pre-trained first convolutional neural network to obtain facial feature information. Meanwhile, the image processing server inputs the to-be-detected image 301 into a pre-trained second convolutional neural network to obtain semantic feature information. Finally, the image processing server analyzes the facial feature information and the semantic feature information to generate the face detection result and display the facial region in the to-be-detected image 301 in a block (as shown in the image labelled by the reference numeral 302).

In the method provided by the above embodiment of the present disclosure, the facial feature information is obtained by inputting the acquired to-be-detected image into the pre-trained first convolutional neural network. Then, the facial feature information is inputted to the pre-trained second convolutional neural network to obtain the semantic feature information. Finally, the facial feature information and the semantic feature information are analyzed to generate the face detection result. Therefore, the face detection is performed by combining the facial feature information and the semantic feature information, such that a blurred image that is unable to display a clear facial outline and clear facial features can be detected, thereby improving the accuracy of the detection result of the blurred image.

Figure 4:
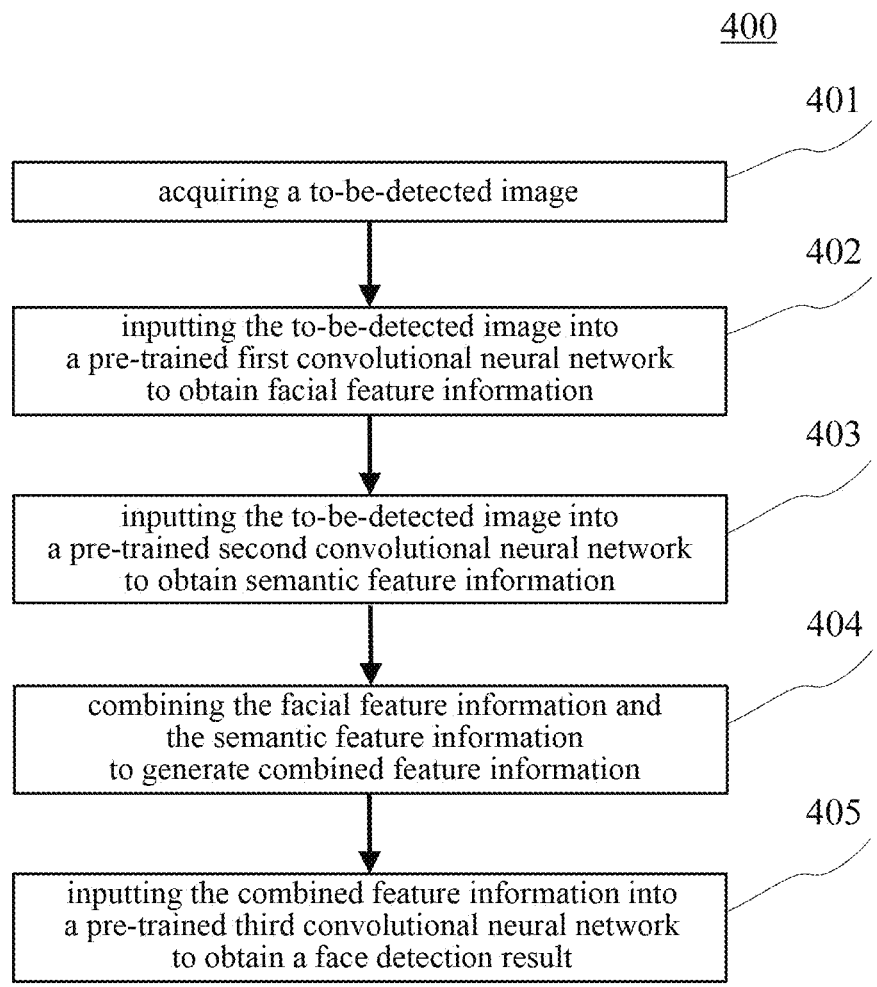
FIG. 4 is a flowchart of another embodiment of the method for detecting a human face according to the present disclosure.

Further referring to FIG. 4, which illustrates a flow 400 of another embodiment of the method for detecting a human face. The flow 400 of the method for detecting a human face includes the steps 401 to 405.

Step 401 includes acquiring a to-be-detected image.

In this embodiment, an electronic device (e.g., the server 105 as illustrated in FIG. 1) on which the method for detecting a human face is performed may acquire the to-be-detected image. The to-be-detected image may be various kinds of images, for example, a blurred image of a person captured in a motion state (e.g., in a running state and in a jumping state) of the person or a clear image of the person captured in a stationary state of the person. Here, the to-be-detected image may be uploaded to the electronic device by a client (e.g., the terminal devices 101, 102 and 103 as illustrated in FIG. 1) communicated with the electronic device by means of a wired connection or a wireless connection. The to-be-detected image may alternatively be locally stored by the electronic device.

Step 402 includes inputting the to-be-detected image into a pre-trained first convolutional neural network to obtain facial feature information.

In this embodiment, the electronic device may input the to-be-detected image into the pre-trained first convolutional neural network to obtain the facial feature information. The first convolutional neural network may be used to extract a facial feature. The first convolutional neural network may include at least one convolutional layer and at least one pooling layer. The convolutional layer may be used to extract an image feature and the pooling layer may be used to perform downsampling on the inputted information. The facial feature information may include a first facial feature map and multiple second facial feature maps (for example, four second facial feature maps or more than four second facial feature maps. Each point in the first facial feature map may be used to represent a confidence level (may be used to represent a possibility or probability of the human face located in a region) of the human face located in a region in the to-be-detected image corresponding to the point in the first facial feature map. Each point in each of the second facial feature maps may be used to represent position information of a region in the to-be-detected image corresponding to the point in the second facial feature maps. It should be noted that the first facial feature map and the second facial feature maps may be represented by matrices. Each point in the first facial feature map and the second facial feature maps may be a numerical value in the matrices. In practice, since the first convolutional neural network includes the pooling layer for performing the downsampling operation, each point in the facial feature maps corresponds to one region of the to-be-detected image. As an example, the multiple second facial feature maps may be four second facial feature maps, and points in the four second facial feature maps may be respectively used to represent a horizontal coordinate of an upper-left vertex, a vertical coordinate of the upper-left vertex, a horizontal coordinate of an lower-right vertex of the region, and a vertical coordinate of the lower-right vertex of a corresponding region in the to-be-detected image.

Step 403 includes inputting the to-be-detected image into a pre-trained second convolutional neural network to obtain semantic feature information.

In this embodiment, the electronic device may input the to-be-detected image into the pre-trained second convolutional neural network to obtain the semantic feature information. The second convolutional neural network may be used to extract a semantic feature of the image. After the to-be-detected image is inputted to the pre-trained second convolutional neural network, the second convolutional neural network may successively perform a downsampling process and an upsampling process. The second convolutional neural network may include at least one convolutional layer, at least one pooling layer, at least one unpooling layer, and at least one deconvolutional layer. It should be pointed out that the semantic feature information may be used to represent a category to which each point in the to-be-detected image belongs. Here, the semantic feature information of each point in the to-be-detected image may be represented by a vector.

In this embodiment, the obtained semantic feature information may include a probability of each point in the to-be-detected image belonging to each preset category of multiple preset categories. The multiple preset categories include a background category and at least one of: a hair category, an eye category, a nose category, a mouth category, and a skin color category. The semantic feature information of the to-be-detected image may be represented by a matrix. For each point in the to-be-detected image, semantic feature information of the point may be represented using an N-dimensional vector. N is an integer not less than one. N values of the N-dimensional vector may respectively represent N kinds of semantic information. For example, a first value of the N-dimensional vector may represent a probability of the point belonging to the background category, a second value of the N-dimensional vector may represent a probability of the point belonging to the hair category, and a third value of the N-dimensional vector may represent a probability of the point belonging to the eye category, which will not be repeatedly described here.

Step 404 includes combining the facial feature information and the semantic feature information to generate combined feature information.

In this embodiment, the electronic device may combine the facial feature information and the semantic feature information to generate the combined feature information. It should be noted that before combining the facial feature information and the semantic feature information, the electronic device may scale the semantic feature information in advance so that the scale of the semantic feature information is the same as that of the facial feature information. The electronic device may combine the facial feature information and the semantic feature information using various feature combining approaches. As an example, the facial feature information and the semantic feature information may be directly stitched to obtain a new matrix as a combined feature and other information.

In some alternative implementations of this embodiment, the electronic device may multiply the facial feature information by the semantic feature information based on corresponding elements to generate the combined feature information. As an example, the facial feature information is represented by a matrix A, the semantic feature information is represented by a matrix B, and the combined feature information is represented by a matrix C. When each of the matrix A, the matrix B, and the matrix C is an n×m matrix (where both n and m are positive integers), a vector C may be obtained in the following way:

$$C[i,j]=A[i,j]\lambda B[i,j].$$

Here, i is a positive integer not greater than n, j is a positive integer not greater than m, and [i,j] is used to represent a position of an element in the matrix.

In some alternative implementations of this embodiment, the electronic device may obtain respective maximum values of respective corresponding elements of the facial feature information and the semantic feature information to generate the combined feature information.

In some alternative implementations of this embodiment, the electronic device may perform threshold truncation on the facial feature information and the semantic feature information based on the corresponding elements, to generate the combined feature information. As an example, the facial feature information is represented by the matrix A, the semantic feature information is represented by the matrix B, and the combined feature information is represented by the matrix C. Each of the matrix A, the matrix B, and the matrix C is the n×m matrix (where both n and m are positive integers). If the value of B[i,j] is greater than a preset threshold (for example, 0.5 or 0.8), the value of the matrix C[i,j] is the same as the matrix A[i,j]. If the value of B[i,j] is not greater than the preset threshold, the value of the matrix C[i,j] is 0. Here, i is the positive integer not greater than n, j is the positive integer not greater than m, and [i,j] is used to represent the position of the element in the matrix.

Step 405 includes inputting the combined feature information into a pre-trained third convolutional neural network to obtain a face detection result.

In this embodiment, the electronic device may input the combined feature information into the pre-trained third convolutional neural network to obtain the face detection result. The third convolutional neural network is used to represent a correspondence of the face detection result to the facial feature information and the semantic feature information. As an example, the combined feature information may be a correspondence table used to represent the correspondence between the combined feature information and the face detection result, and pre-established by a technician through a lot of statistics.

In some alternative implementations of this embodiment, the third convolutional neural network may be trained and obtained through the following steps. First, a preset training sample may be extracted. The training sample includes facial feature information and semantic feature information of multiple images. Then, facial feature information and semantic feature information of each image of the multiple images may be combined to obtain combined feature information of the image. Finally, the combined feature information of each image of the multiple images may be used as an input, and the face detection result may be used as an output to train and obtain the third convolutional neural network by using a machine learning method. It should be noted that the third convolutional neural network may be obtained by performing supervised training by using the existing deep convolutional neural network (e.g., DenseBox, VGGNet, ResNet, and SegNet).

As may be seen from FIG. 4, compared with the embodiment corresponding to FIG. 2, the flow 400 of the method for detecting a human face in this embodiment emphasizes the step of analyzing the facial feature information and the semantic feature information. Therefore, according to the solution described in this embodiment, the combined feature information by combining the facial feature information and the semantic feature information may be analyzed using the pre-trained third convolutional neural network to recognize the blurred image, which further improves the accuracy of the detection result on the blurred image.

Figure 5:
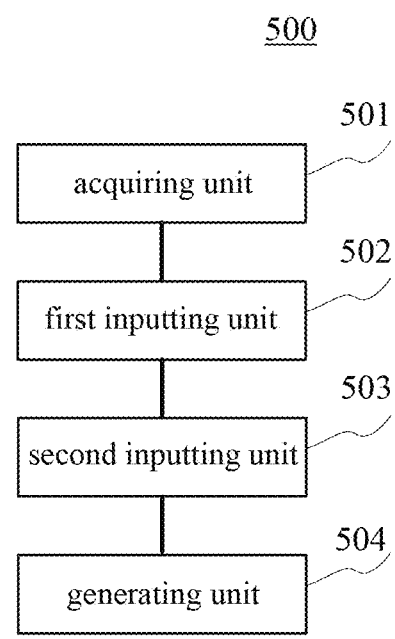
FIG. 5 is a schematic structural diagram of an embodiment of an apparatus for detecting a human face according to the present disclosure.

Further referring to FIG. 5, as an implementation of the method shown in the above figures, the present disclosure provides an embodiment of an apparatus for detecting a human face. The embodiment of the apparatus corresponds to the embodiment of the method as illustrated in FIG. 2, and this apparatus may be applied in various electronic devices.

As shown in FIG. 5, the apparatus 500 for detecting a human face in this embodiment includes: an acquiring unit 501, configured to acquire a to-be-detected image; a first inputting unit 502, configured to input the to-be-detected image into a pre-trained first convolutional neural network to obtain facial feature information, the first convolutional neural network being used to extract a facial feature; a second inputting unit 503, configured to input the to-be-detected image into a pre-trained second convolutional neural network to obtain semantic feature information, the second convolutional neural network being used to extract a semantic feature of the image; and a generating unit 504, configured to analyze the facial feature information and the semantic feature information to generate a face detection result.

In this embodiment, the acquiring unit 501 may acquire the to-be-detected image. The to-be-detected image may be various kinds of images, for example, a blurred image of a person captured in a motion state (e.g., in a running state and in a jumping state) of the person or a clear image of the person captured in a stationary state of the person.

In this embodiment, the first inputting unit 502 may input the to-be-detected image into the pre-trained first convolutional neural network to obtain the facial feature information. The first convolutional neural network may be used to extract the facial feature. In practice, the first convolutional neural network may be a fully convolutional network (FCN).

In this embodiment, the second inputting unit 503 may input the to-be-detected image into the pre-trained second convolutional neural network to obtain the semantic feature information. The second convolutional neural network may be used to extract the semantic feature of the image. After the to-be-detected image is inputted into the pre-trained second convolutional neural network, the second convolutional neural network may successively perform a downsampling process and an upsampling process. It should be pointed out that the semantic feature information may be used to represent a category (e.g., background, human face, and body) to which each point (i.e., pixel) in the to-be-detected image belongs. Here, the semantic feature information of each point in the to-be-detected image may be represented by a vector.

In this embodiment, the generating unit 504 may analyze the facial feature information and the semantic feature information in various ways to generate the face detection result.

In some alternative implementations of this embodiment, the facial feature information may include a first facial feature map and multiple second facial feature maps. Each point in the first facial feature map may be used to represent a confidence level of a human face located in a region in the to-be-detected image corresponding to the point in the first facial feature map. Each point in each of the multiple second facial feature maps may be used to represent position information of the region in the to-be-detected image corresponding to the point in the second facial feature maps. The first facial feature map and the second facial feature maps are respectively represented by matrixes.

In some alternative implementations of this embodiment, the semantic feature information may include a probability of each point in the to-be-detected image belonging to each preset category of multiple preset categories. The multiple preset categories include a background category and at least one of: a hair category, an eye category, a nose category, a mouth category, and a skin color category. The semantic feature information is represented by a matrix.

In some alternative implementations of this embodiment, the generating unit 504 may include: a combining module and an inputting module (not shown). The combining module is configured to combine the facial feature information and the semantic feature information to generate combined feature information. The inputting module is configured to input the combined feature information into a pre-trained third convolutional neural network to obtain the face detection result. The third convolutional neural network is used to represent a correspondence of the face detection result to the facial feature information and the semantic feature information.

In some alternative implementations of this embodiment, the combining module may be further configured to combine the facial feature information and the semantic feature information to generate the combined feature information in any one of the following ways: multiplying the facial feature information by the semantic feature information based on corresponding elements, obtain respective maximum values of respective corresponding elements of the facial feature information and the semantic feature information, and performing threshold truncation on the facial feature information and the semantic feature information based on the corresponding elements.

In some alternative implementations of this embodiment, the apparatus 500 for detecting a human face may further include an extracting unit, a combining unit and a training unit (not shown). The extracting unit is configured to extract a preset training sample. The training sample includes facial feature information and semantic feature information of multiple images. The combining unit is configured to combine facial feature information and semantic feature information of each of the multiple images to obtain combined feature information of the image. The training unit is configured to use the combined feature information of each of the multiple images as an input and the face detection result as an output to train and obtain the third convolutional neural network by using a machine learning method.

In the apparatus provided in this embodiment according to the present disclosure, the first inputting unit 502 inputs the to-be-detected image acquired by the acquiring unit 501 into the pre-trained first convolutional neural network to obtain the facial feature information. Then, the second inputting unit 503 inputs the to-be-detected image into the pre-trained second convolutional neural network to obtain the semantic feature information. Finally, the generating unit 504 analyzes the facial feature information and the semantic feature information to generate the face detection result. Therefore, the face detection is performed by combining the facial feature information and the semantic feature information, such that a blurred image that is unable to display a clear facial outline and clear facial features can be detected, thereby improving the accuracy of the detection result of the blurred image.

Figure 6:
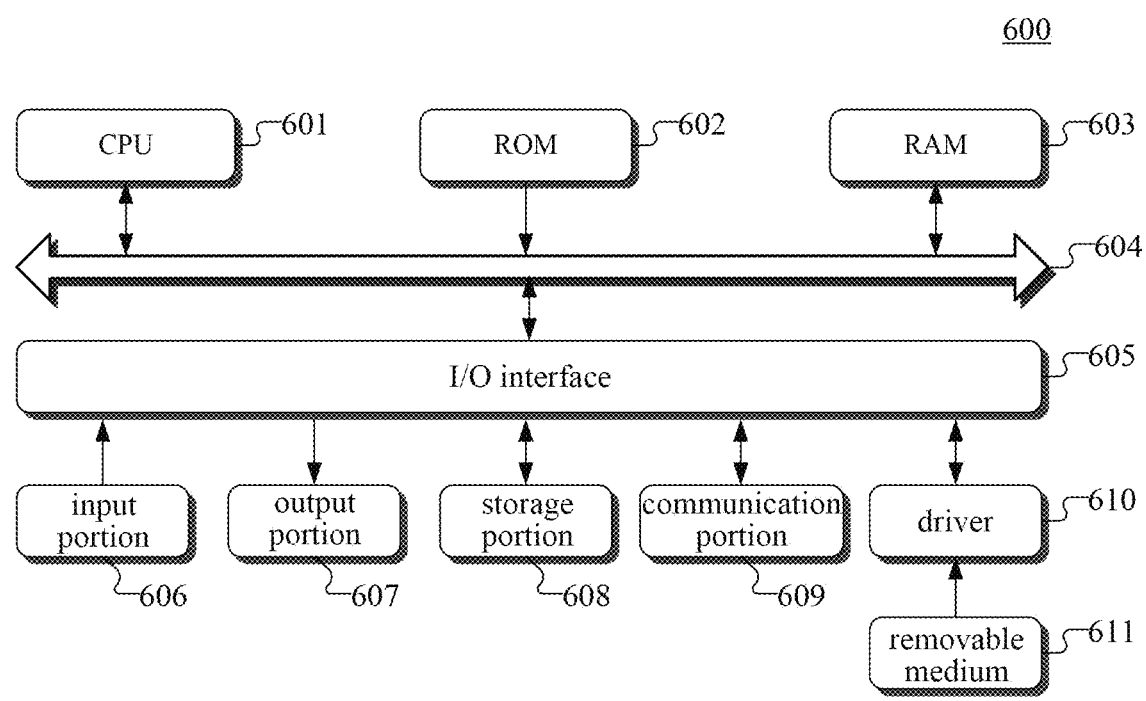
FIG. 6 is a schematic structural diagram of a computer system adapted to implement a server according to embodiments of the present disclosure.

Referring to FIG. 6, a schematic structural diagram of a computer system 600 adapted to implement a server of the embodiments of the present disclosure is shown. The server shown in FIG. 6 only is an example and should not be a limitation of the function and range of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate an installation of a computer program read from the removable medium on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units or modules involved in the embodiments of the present disclosure may be implemented by means of software or hardware. The described units or modules may also be provided in a processor, for example, described as: a processor, including an obtaining unit, a first input unit, a second input unit and a generating unit, where the names of these units or modules do not in some cases constitute a limitation to such units or modules themselves. For example, the obtaining unit may also be described as "a unit for obtaining a to-be-detected image."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquiring a to-be-detected image; inputting the to-be-detected image into a pre-trained first convolutional neural network to obtain facial feature information, the first convolutional neural network being used to extract a facial feature; inputting the to-be-detected image into a pre-trained second convolutional neural network to obtain semantic feature information, the second convolutional neural network being used to extract a semantic feature of the image; and analyzing the facial feature information and the semantic feature information to generate a face detection result.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting a human face, comprising:
   acquiring a to-be-detected image;
   inputting the to-be-detected image into a pre-trained first convolutional neural network to obtain facial feature information, the first convolutional neural network being used to extract a facial feature;
   inputting the to-be-detected image into a pre-trained second convolutional neural network to obtain semantic feature information, the second convolutional neural network being used to extract a semantic feature of the image, wherein the semantic feature information comprises: a probability that each point in the to-be-detected image belongs to a preset background category, a probability that each point in the to-be-detected image belongs to a preset hair category, a probability that each point in the to-be-detected image belongs to a preset eye category, a probability that each point in the to-be-detected image belongs to a preset nose category, a probability that each point in the to-be-detected image belongs to a preset mouth category, and a probability that each point in the to-be-detected image belongs to a preset skin color category; and
   analyzing the facial feature information and the semantic feature information to generate a face detection result.

2. The method according to claim 1, wherein the facial feature information comprises a first facial feature map and a plurality of second facial feature maps, wherein each point in the first facial feature map is used to represent a confidence level of the human face located in a region of the to-be-detected image corresponding to the each point of the first facial feature map, each point in each of the plurality of second facial feature maps is used to represent position information of a region of the to-be-detected image corresponding to the each point of the second facial feature map, and the first facial feature map and the plurality of second facial feature maps are respectively represented by matrixes.

3. The method according to claim 1, wherein the semantic feature information is represented by a matrix.

4. The method according to claim 1, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

5. The method according to claim 2, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

6. The method according to claim 3, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

7. The method according to claim 4, wherein the combining the facial feature information and the semantic feature information to generate combined feature information comprises:
   combining the facial feature information and the semantic feature information to generate the combined feature information in any one of the following ways: multiplying the facial feature information by the semantic feature information based on corresponding elements, obtaining respective maximum values of respective corresponding elements of the facial feature information and the semantic feature information, and performing threshold truncation on the facial feature information and the semantic feature information based on the corresponding elements.

8. The method according to claim 4, further comprising training the third convolutional neural network, comprising:
   extracting a preset training sample, wherein the training sample comprises facial feature information and semantic feature information of a plurality of images;
   combining facial feature information and semantic feature information of each image of the plurality of images to obtain combined feature information of the each image; and
   using the combined feature information of the each image of the plurality of images as an input and the face detection result as an output to train and obtain the third convolutional neural network by using a machine learning method.

9. An apparatus for detecting a human face, comprising:
   at least one processor; and
   a memory storing instructions, the instructions when executed by the at least one processor, cause the at least one processor to perform operations, the operations comprising:
   acquiring a to-be-detected image;
   inputting the to-be-detected image into a pre-trained first convolutional neural network to obtain facial feature information, the first convolutional neural network being used to extract a facial feature;
   inputting the to-be-detected image into a pre-trained second convolutional neural network to obtain semantic feature information, the second convolutional neural network being used to extract a semantic feature of the image, wherein the semantic feature information comprises: a probability that each point in the to-be-detected image belongs to a preset background category, a probability that each point in the to-be-detected image belongs to a preset hair category, a probability that each point in the to-be-detected image belongs to a preset eye category, a probability that each point in the to-be-detected image belongs to a preset nose category, a probability that each point in the to-be-detected image belongs to a preset mouth category, and a probability that each point in the to-be-detected image belongs to a preset skin color category; and
   analyzing the facial feature information and the semantic feature information to generate a face detection result.

10. The apparatus according to claim 9, wherein the facial feature information includes a first facial feature map and a plurality of second facial feature maps, wherein each point in the first facial feature map is used to represent a confidence level of the human face located in a region of the to-be-detected image corresponding to the each point of the first facial feature map, each point in each of the plurality of second facial feature maps is used to represent position information of a region of the to-be-detected image corresponding to the each point of the second facial feature maps, and the first facial feature map and the plurality of second facial feature maps are respectively represented by matrixes.

11. The apparatus according to claim 9, wherein the semantic feature information is represented by a matrix.

12. The apparatus according to claim 9, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

13. The apparatus according to claim 10, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

14. The apparatus according to claim 11, wherein the analyzing the facial feature information and the semantic feature information to generate a face detection result comprises:
   combining the facial feature information and the semantic feature information to generate combined feature information; and
   inputting the combined feature information into a pre-trained third convolutional neural network to obtain the face detection result, wherein the third convolutional neural network is used to represent a correspondence of the face detection result to the facial feature information and the semantic feature information.

15. The apparatus according to claim 12, wherein the combining the facial feature information and the semantic feature information to generate combined feature information comprises:
   combining the facial feature information and the semantic feature information to generate the combined feature information in any one of the following ways: multiplying the facial feature information by the semantic feature information based on corresponding elements, obtaining respective maximum values of respective corresponding elements of the facial feature information and the semantic feature information, and performing threshold truncation on the facial feature information and the semantic feature information based on the corresponding elements.

16. The apparatus according to claim 12, wherein the operation further comprises training the third convolutional neural network, comprising:

extracting a preset training sample, wherein the training sample comprises facial feature information and semantic feature information of a plurality of images;

combining facial feature information and semantic feature information of each image of the plurality of images to obtain combined feature information of the each image; and using the combined feature information of the each image of the plurality of images as an input and the face detection result as an output to train and obtain the third convolutional neural network by using a machine learning method.

17. A non-transitory computer medium, storing a computer program, wherein the program, when executed by a processor, cause the processor to perform operations, the operations comprising:

acquiring a to-be-detected image;

inputting the to-be-detected image into a pre-trained first convolutional neural network to obtain facial feature information, the first convolutional neural network being used to extract a facial feature;

inputting the to-be-detected image into a pre-trained second convolutional neural network to obtain semantic feature information, the second convolutional neural network being used to extract a semantic feature of the image, wherein the semantic feature information comprises: a probability that each point in the to-be-detected image belongs to a preset background category, a probability that each point in the to-be-detected image belongs to a preset hair category, a probability that each point in the to-be-detected image belongs to a preset eye category, a probability that each point in the to-be-detected image belongs to a preset nose category, a probability that each point in the to-be-detected image belongs to a preset mouth category, and a probability that each point in the to-be-detected image belongs to a preset skin color category; and analyzing the facial feature information and the semantic feature information to generate a face detection result.

* * * * *